United States Patent [19]

Price

[11] Patent Number: 5,644,964

[45] Date of Patent: Jul. 8, 1997

[54] WORKPIECE CLAMPING MECHANISM

[76] Inventor: T. David Price, 4543 Woodlane Dr., Woodbury, Minn. 55125

[21] Appl. No.: 194,715

[22] Filed: Feb. 10, 1994

[51] Int. Cl.⁶ .................................................. B26D 7/02
[52] U.S. Cl. .............................. 83/459; 83/465; 83/466; 83/471.3; 144/243; 144/250.2; 269/236; 269/238; 269/254 R; 269/303; 269/315
[58] Field of Search ......................... 83/446, 452, 459, 83/462, 465, 466, 471.2, 471.3; 144/242 E, 243, 253 F, 307, 250.2, 253.6; 267/228; 269/200, 204, 217, 231, 232, 235, 236, 238, 303, 315, 224, 254 R

[56] References Cited

U.S. PATENT DOCUMENTS

| | | | |
|---|---|---|---|
| 145,354 | 12/1873 | Loetscher | 83/471.3 X |
| 227,876 | 5/1880 | Blair | 83/446 |
| 475,782 | 5/1892 | Luger | 144/253 F X |
| 516,394 | 3/1894 | Kellogg | 144/243 |
| 534,447 | 2/1895 | McConnell | 144/242 E X |
| 1,022,176 | 4/1912 | Boothby | 144/243 |
| 2,525,894 | 10/1950 | Graham | 144/242 E X |
| 2,722,247 | 11/1955 | Schroeder et al. | 83/446 |
| 3,192,815 | 7/1965 | Zimmerman | 83/471 |
| 3,221,743 | 12/1965 | Thompson et al. | 128/303 |
| 3,344,819 | 10/1967 | Mitchell | 83/471.3 |
| 3,367,375 | 2/1968 | Watson, Jr. | 83/404.1 |
| 4,002,329 | 1/1977 | Petrowski | 269/318 |
| 4,132,256 | 1/1979 | Jones | 83/446 X |
| 4,300,426 | 11/1981 | Weaver | 83/471.3 |
| 4,341,247 | 7/1982 | Price | 144/287 |
| 4,455,904 | 6/1984 | Havner et al. | 83/375 |
| 4,476,757 | 10/1984 | Morris | 83/446 |
| 4,566,304 | 1/1986 | Van Cleave et al. | 269/236 X |
| 4,602,497 | 7/1986 | Wallis | 269/235 X |
| 5,000,237 | 3/1991 | Berkeley et al. | 144/253 F X |
| 5,105,862 | 4/1992 | Skinner et al. | 144/287 |
| 5,134,914 | 8/1992 | Morosini | 83/395 |

OTHER PUBLICATIONS

Interlok™ Precision Mitering System Fits Any Miter Saw, ©1992 Advanced Precision Products, Inc.
Interlok™ Precision Framing System, ©1993 Advanced Precision Products, Inc.

Primary Examiner—Rinaldi I. Rada
Assistant Examiner—Clark F. Dexter
Attorney, Agent, or Firm—Merchant, Gould Smith, Edell Welter & Schmidt

[57] ABSTRACT

A clamping mechanism is provided for securing a workpiece proximate a power tool on a work surface of the type having a support surface defined thereon and extending generally orthogonal thereto. The clamping mechanism applies a force to the workpiece to secure the workpiece between the clamping mechanism and the support surface. The force applied to the workpiece has a component directed substantially perpendicular to the support surface, and an additional component which is directed substantially parallel to the support surface in a direction away from the power tool to resist pulling forces which are applied by the power tool to the workpiece. Further, in a preferred embodiment of the invention, the clamping mechanism is oriented proximate a work head of the power tool without entering an effective work area of the power tool. Increased safety is provided by the preferred constructions insofar as the clamping mechanism is kept outside of the effective working area of the power tool, and as the clamping mechanism is actuatable by a user without placing the user's hands within the work area of the tool.

21 Claims, 4 Drawing Sheets

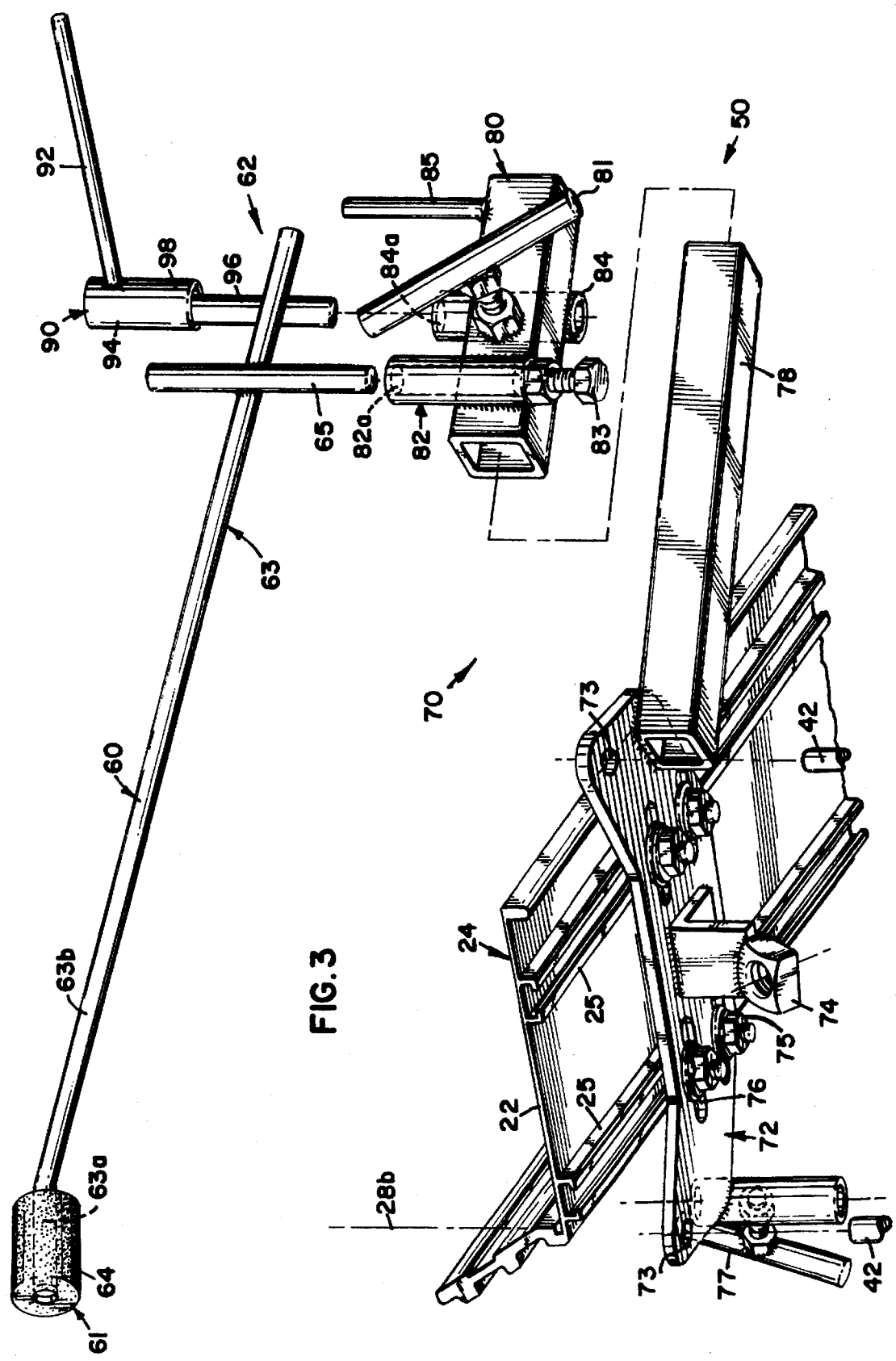

WORKPIECE CLAMPING MECHANISM

FIELD OF THE INVENTION

The invention is directed to a clamping mechanism, and more particularly, to a clamping mechanism for use in securing workpieces to a support surface for operation thereon by a power tool.

BACKGROUND OF THE INVENTION

The use of power tools to perform operations such as cutting, sawing, drilling, etc. on a workpiece is often problematic when the workpiece is not securely held in place, particularly with regard to safety and accuracy. For example, cutting aluminum picture frame mouldings at sharp angles such as 45° with a power miter saw can produce pulling forces on the mouldings which often make it very difficult for an operator to safely hold the moulding by hand and still get an accurate cut. This problem exists since cutting a workpiece at a 45° angle with a miter saw tends to pull the material towards the saw blade. Especially if the workpiece being cut is rather small, for example three inches long, an operator's hand may need to be placed dangerously close to the blade, which introduces unacceptably hazardous conditions for the operator.

Various clamping mechanisms are available to assist an operator in securing workpieces while these workpieces are operated upon by a power tool. However, many of these available clamping mechanisms suffer from a number of drawbacks which diminish their performance, particularly with regard to clamping small workpieces.

For example, popular standard power miter saws such as the Ryobi Model TS 254 power miter saw have warning lines cast into the base of the saw table warning users not to place their fingers closer than about 6 inches from the saw blade. This saw has holes cast into the base to accept screw clamps that are an accessory for the saw. However, these holes are about 7 inches from the saw blade, so the clamp will not work on very small pieces. The Ryobi clamp works in a straight line from the front to the back of the saw, and consequently, it cannot be placed close to the saw blade or it will be sawed into when the saw is turned to an angle such as 45°. The Ryobi clamps also do not work well for clamping many of the small aluminum extrusions that picture framers use. Also, the clamp frequently rides upward as it is being closed on these low profile mouldings, and it is therefore difficult to clamp these mouldings even when the pieces required are long enough for the clamp. Other brands of miter saws have problems similar to the Ryobi miter saw with regard to clamping and cutting very small pieces of material.

Power miter saws, among others, provide unique difficulties in clamping in that these saws are capable of rotating about an axis perpendicular to a work surface thereof (typically ±45°). Since these saws are required to rotate, any clamps therefor must stay clear of the saw blade and the saw adjusting handle that protrudes from the front of the saw regardless of the rotational position of the saw. While clamps can also be operated from the rear of the saw, a similar problem exists insofar as the rear of the saw includes a swing arm that supports the saw and the motor and rotates concurrently therewith. Conventional clamps which are used on these types of saws must necessarily have sufficient clearance from the saw to enable a free range of rotation for the saw. As discussed above, this limits the applicability of these clamps for use with smaller workpieces which must be secured, if at all, closer to the blade of the saw.

Consequently, a need exists in the art for a clamping mechanism which is capable of supporting a workpiece relatively close to a power tool workhead such as a power miter saw, but which will not interfere with or otherwise obstruct the power tool. Further, as discussed above, a need exists for a clamping mechanism which is capable of adequately resisting the pulling forces applied by a power tool during operation, in order to provide greater accuracy and additional safety for an operator.

SUMMARY OF THE INVENTION

The invention addresses these and other problems in the prior art by providing a clamping mechanism which is capable of securing an object to a support surface proximate a power tool, and preferably applying a clamping force in such a manner to resist pulling forces applied by a power tool during its operation. To this extent, the invention is particularly suitable for securing small objects for operation thereon by a power tool to provide greater performance and operator safety.

In accordance with one aspect of the invention, there is provided a clamping mechanism for securing a workpiece proximate a power tool on a work surface of the type having a support surface defined thereon and extending generally orthogonal thereto. The clamping mechanism includes a clamp member and a force supplying means for securing the workpiece between the clamp member and the support surface by applying a force to the clamp member. The clamp member has a first end configured to operatively abut a workpiece and a second end. The force applied by the force applying means has first and second components directed in a plane generally parallel to the work surface. The first component of the force is directed substantially perpendicular to the support surface, and the second component of the force is directed substantially parallel to the support surface in a direction away from the power tool. In this configuration, the clamp member is capable of resisting pulling forces applied by the power tool to the workpiece.

In accordance with a further aspect of the invention, a clamping mechanism is provided for securing an object against a support surface. The clamping mechanism includes a clamp support member configured at a fixed position relative to a support surface, a clamp member having first and second ends and pivotally mounted to the clamp support member to pivot about a clamp axis, and a force applying member operatively configured to apply a rotational force to the clamp member. The clamp member is pivotable in a plane generally orthogonal to the support surface. Further, in a locked configuration, the clamp member extends at an acute angle relative to the support surface. The rotational force applied to the clamp member secures an object between the support surface and the clamp member proximate the first end thereof. In such a configuration, the clamp member applies a force laterally to the object in securing the object between the support surface and the clamp member.

These and other advantages and features which characterize the invention are pointed out with particularity in the claims annexed hereto and forming a part hereof. However, for a better understanding of the invention, its advantages and objectives obtained by its use, reference should be made to the drawing which forms a further part hereof and to the accompanying descriptive matter, in which there is described a preferred embodiment of the invention.

BRIEF DESCRIPTION OF THE DRAWING

FIG. 3 is an exploded perspective view of one of the preferred clamping mechanisms of FIG. 1, shown mounted to the underside of an extension.

DETAILED DESCRIPTION OF THE PREFERRED EMBODIMENT

Figure 1:
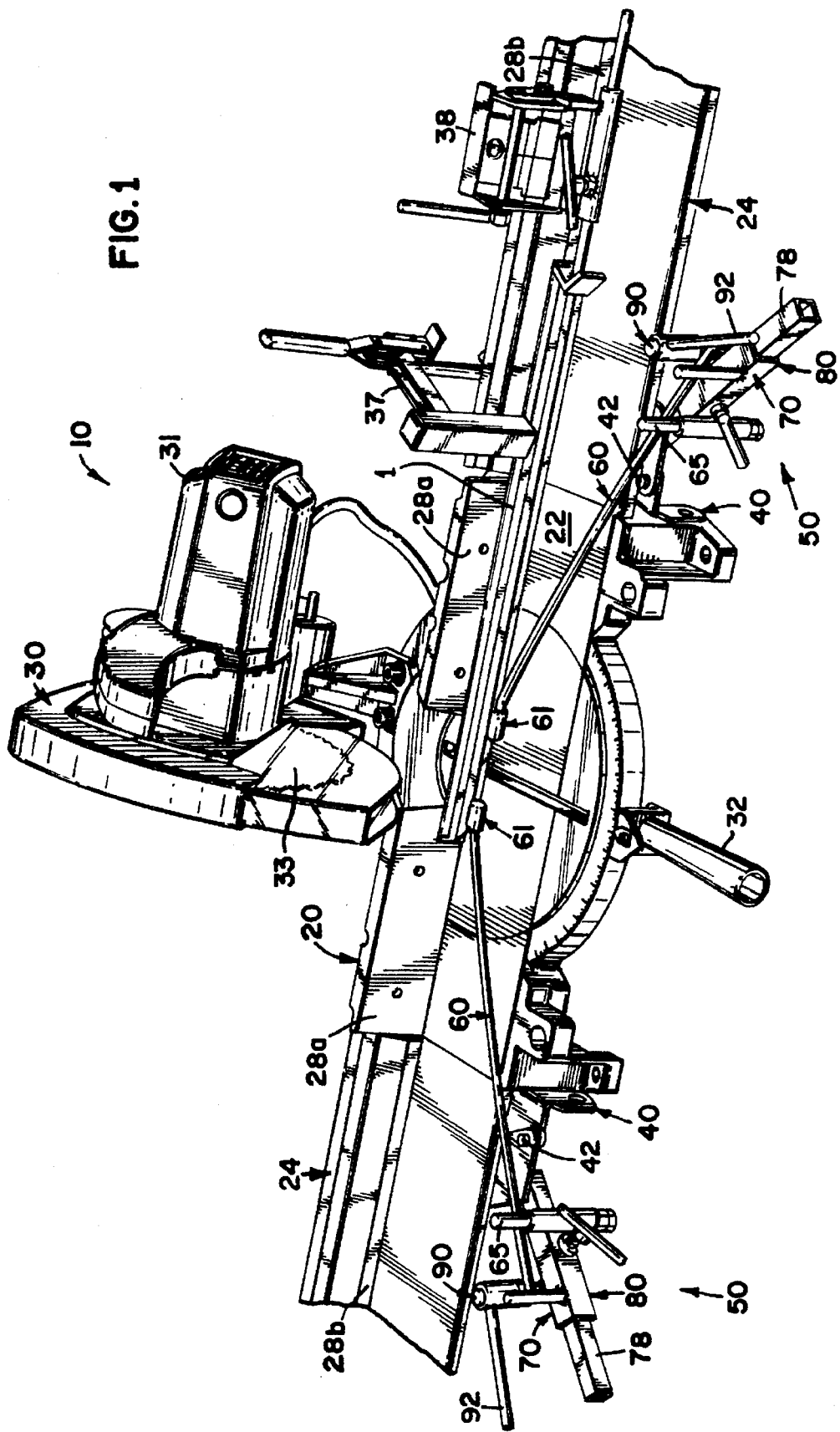
FIG. 1 is a perspective view of a power miter saw with extensions mounted to a work table, showing preferred clamping mechanisms constructed consistent with the principles of the invention mounted thereto.

Turning to the drawings, wherein like numbers denote like parts throughout the several views, FIG. 1 shows a power tool 10 with preferred clamping mechanisms 50 consistent with the invention mounted thereto. Clamping mechanisms 50 operate to secure a workpiece 1 against a support surface 28a and 28b which is disposed on a work surface 22. The power tool 10 shown in FIG. 1 is a Ryobi TS 254 power miter saw, which is commonly used for operations such as cutting picture frame mouldings. Workpiece 1 is an aluminum frame member; however, it will be appreciated that other types of materials are commonly used for picture frame mouldings, including wood, other metals, and plastic, for example. Also, objects other than frame mouldings are often operated upon by power tools. It will also be appreciated that clamping mechanisms and the like are useful with many types of power tools such as radial arm saws, drills, routers, etc., as well as many manually-operated tools. Further, other applications outside of picture framing routinely use clamping mechanisms, including carpentry, woodworking and metalworking, for example. Therefore, it will be appreciated that the use of the preferred clamping mechanisms with a power miter saw to cut picture frame mouldings is merely shown as an exemplary embodiment, and the present invention is not limited to the particular application shown herein.

Power tool 10 includes a work table 20 with a tool work head 30 attached thereto for performing operations on workpieces. Work table 20 includes a work surface 22 which provides the primary support surface for workpieces on power tool 10. Typically, work surface 22 is parallel to the floor or surface on which power tool 10 is placed. It may also be seen that extensions 24 may be attached at each end of work table 20 to provide a longer effective work surface for performing operations on longer workpieces. The use of such extensions is particularly helpful for picture framing applications, wherein relatively long frame mouldings typically must be cut to size to form picture frames.

Extensions 24 may be of the type which are the subject of my U.S. Pat. No. 4,341,247, issued Jul. 27, 1982. These extension constructions provide quick and simple connection and disconnection to and from work table 20. To the extent necessary to support this disclosure, the disclosure of this reference is incorporated by reference herein.

Summarizing my above-identified U.S. patent, a coupler bracket is affixed to each side of the power tool work table. The coupler bracket contains upwardly projecting and horizontally displaced stud connectors. Each coupler bracket also includes a strike plate member upon its side surface. Corresponding coupler plates are affixed to the underside of the extensions. Each of the coupler plates includes receptor holes which are configured to receive the stud connectors of a corresponding coupler bracket. Further, a bracket with a threaded aperture is mounted at a 45° angle on the coupler plate. In order to connect the extension to the work table, the coupler plate is aligned transversely to the coupler bracket (parallel to the work surface), such that the stud connectors are operatively received in the receptor holes. A tightening means comprising a threaded bolt is then screwed through the bracket on the coupler plate to abut the strike plate on the coupler bracket, thereby securing the extension to the work table. Removal of the extensions is basically the reverse of the above.

A support surface 28a oriented generally orthogonal to work surface 22 is preferably included on work table 20. An extension of this surface is also provided on extensions 24 as support surface 28b. Support surface 28a and 28b provides a fence or rail to which a workpiece may be secured when operated upon by power tool 10.

Other clamps, members, etc. may also be included on work table 20. For instance, a clamp 37 may be provided for securing a workpiece against work surface 22. Further, a stop 38 such as the stop mechanisms shown in my prior U.S. Pat. Nos. 4,693,158 and 5,040,443 may be provided for locating the workpiece at a proper position respective to work head 30 of power tool 10. Also, rulers or guides such as those shown in my U.S. Pat. No. 5,040,443 may be supplied on work table 20 and extensions 24 for measurement purposes. To the extent necessary to support this disclosure, the disclosures of my U.S. Pat. Nos. 4,693,158 and 5,040,443 are incorporated by reference herein. Other commonly used devices for power tools and the like may be attached as will be appreciated by those of skill in the art.

Figure 2:
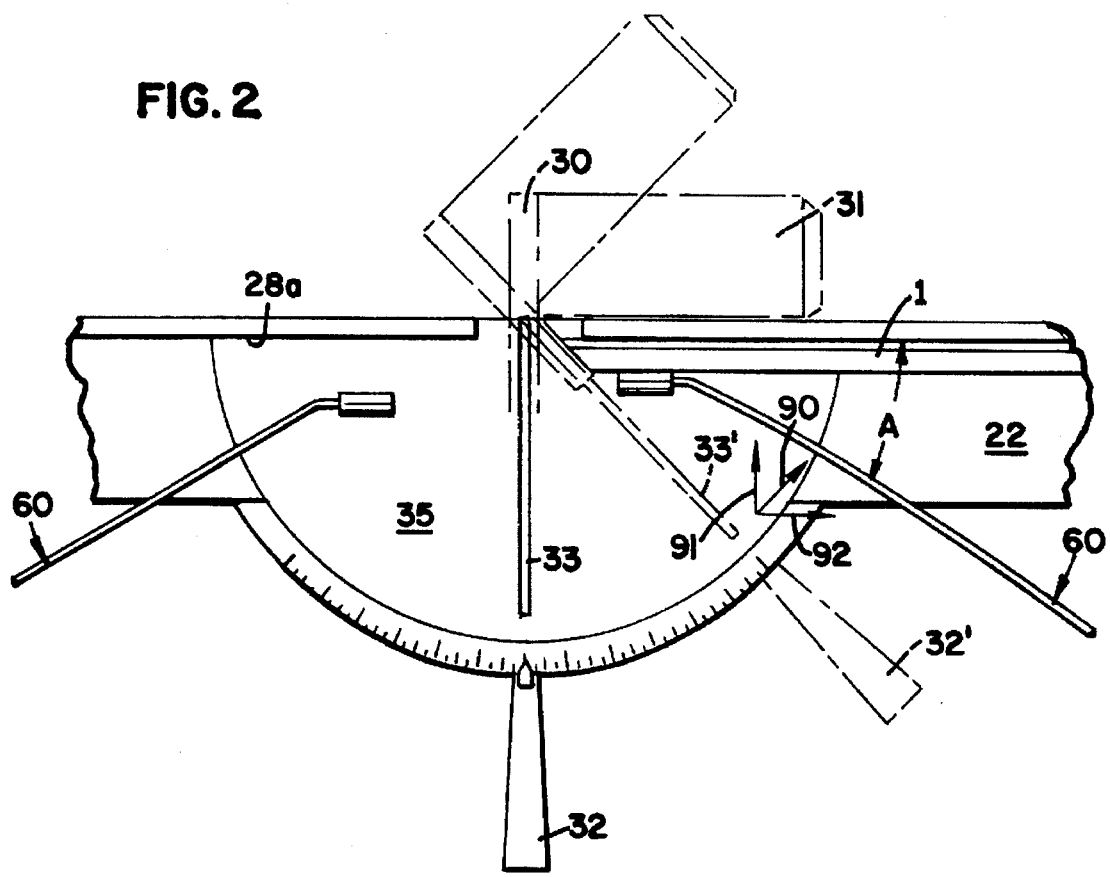
FIG. 2 is a top plan view of the power miter saw and preferred clamping mechanisms of FIG. 1, wherein the clamping mechanism on the left is in an unlocked configuration, and the clamping mechanism on the right is in a locked configuration, and wherein an angled position of the work head of the power miter saw is shown in phantom.

As mentioned above, power tool 10 is preferably a Ryobi TS 254 miter saw, although it is understood other suitable miter saws may also be used. This type of saw includes a work head 30 having a motor 31 and a saw blade 33. As seen in FIG. 2, a working area 35 is provided for power tool 10 which is defined by the area in which the tool may be rotated (e.g., by moving handle 32) for cutting workpieces at various angles, such as the position shown in phantom by saw blade 33' and handle 32'. As is common in many picture framing applications, a miter saw is preferably rotatable to ±45° from a center transversely-oriented position, although larger degrees of rotation may be used.

It is preferable to keep work area 35 devoid of any clamping mechanisms or other members to prevent obstruction of work head 30, and to reduce the possibility of the saw blade 33 hitting any objects when the power tool is running. It will also be appreciated that it is preferable to keep the area occupied by the remainder of the work head of the miter saw (such as motor 31 on the back side of the work head) free from any obstructions, so as to not restrict movement of the work head between various positions.

Returning to FIG. 1, each of the preferred clamping mechanisms 50 includes a clamp member 60 and a force applying member 90 rotatably mounted on a clamp support 70. Each clamping mechanism 50 is preferably constructed of steel; however, other materials, such as other metals, alloys, plastics, composites, etc. may be used. Further, it will be appreciated that various known construction techniques may be utilized to form clamping mechanism 50, such as welding, cutting, drilling, forging, casting, etc.

The basic operation of clamping mechanism is as follows. Clamp member 60 is pivotably mounted to clamp support 70, with an end thereof oriented proximate the working head of the power tool. The force applying member 90 is rotatably mounted to the clamp support in such a manner that a rotation of the force applying member applies a rotational force to clamp member 60. The rotation of clamp member 60 applies a lateral force to a workpiece to secure it between clamp member 60 and support surface 28a and 28b of work table 20.

FIG. 3 shows a preferred clamping mechanism 50 which is also used as a part of the connecting mechanism between an extension 24 and the work table of power tool 10. Clamp support 70 of clamping mechanism 50 includes a connecting member 72 with a slidable member 80 slidably disposed thereon. Clamp support 70 is configured to be secured at a fixed position with respect to a support surface such that the axis about which clamp member 60 rotates is also fixed with respect to the support surface.

Figure 4:
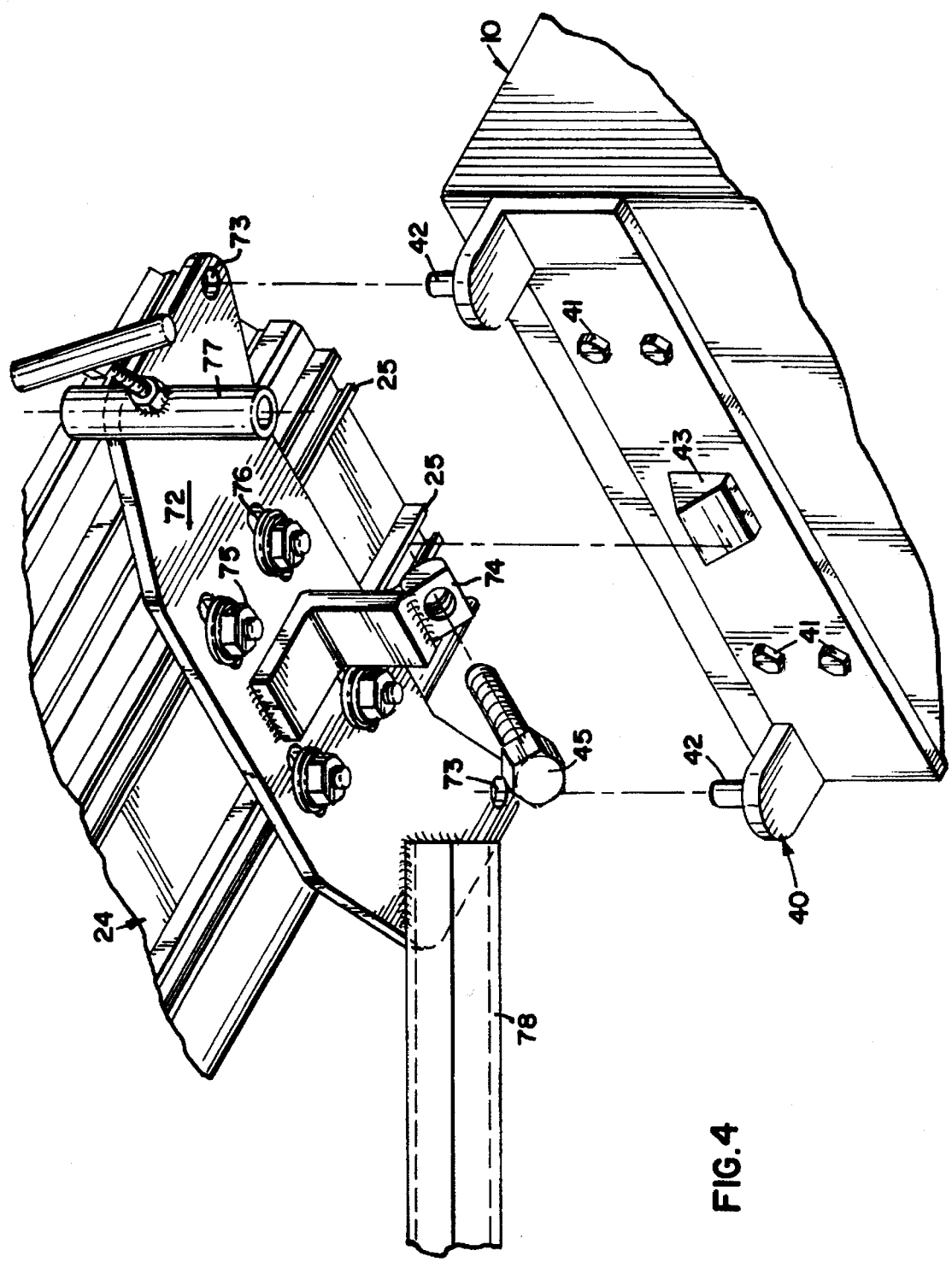
FIG. 4 is a partial perspective view of a connection between an extension and the work table of the power miter saw of FIG. 1, wherein a connecting member of a preferred clamping mechanism forms a part of the connecting mechanism between the extension and work table.

As the preferred clamping mechanism 50 may be utilized to connect extension 24 to the work table of power tool 10, a coupler bracket as described in my prior U.S. Pat. No. 4,341,247 must be fixably supported on a side surface of power tool 10. As shown in FIG. 4, coupler bracket 40 is secured to power tool 10 by a number of fasteners 41, and includes upwardly-projecting stud connectors 42 (also shown in FIG. 3) disposed on a top surface thereof, as well as a strike plate member 43 for receiving a tightening means mounted to a corresponding coupler plate.

As shown in FIGS. 3 and 4, connecting member 72 of clamp support 70 replaces the coupler plate described in my prior U.S. patent. Connecting member 72 includes receptor holes 73 which are arranged and configured to receive stud connectors 42 on coupler bracket 40. Further, a threaded aperture is disposed on bracket 74 oriented at about a 45° angle the connecting member for accepting a tightening means 45. Connecting member 72 is preferably secured to rails 25 along the underside of extension 24 using fasteners 75 through apertures 76.

To connect extension 24 to power tool 10, coupler bracket 40 is secured by fasteners 41 to the side of the work table of power tool 10, and connecting member 72 is affixed to the rails on the underside of extension 24 by fasteners 75. Next, extension 24 is placed in an operating position with stud connectors 42 received within receptor holes 73. Finally, tightening means 45, which is preferably a threaded bolt, is screwed through the threaded aperture on bracket 74 to apply a force against strike plate member 43 such that a strong connection is formed to secure extension 24 on work table 20 of power tool 10.

It will be appreciated that a connecting member similar to connecting member 72 may alternatively be secured to the underside of work table 24 at a variety of positions along rails 25, rather than being utilized as the coupler plate for connecting extension 24 to power tool 10. This enables a connecting member to be adjustable along the length of extension 24 by loosening fasteners 75. Alternatively, a quick release mechanism such as a T-shaped bolt could be utilized to provide quicker and easier adjustment of connecting member 72 along extension 24. One skilled in the art will also appreciate that different connection mechanisms for securing connecting member 72 to extension 24 may be provided dependent upon the particular extension and work table to which a clamping mechanism is attached. Further it is also appreciated that different connection mechanisms may be utilized to attach to the saw directly or to the table on which the saw sits.

As is best shown in FIG. 3, connecting member 72 also includes a flange 78 which is welded to connecting member 72 and extends at about a 45° angle to support surface 28a and 28b, generally directed away from the work head of power tool 10. Flange 78 is preferably rectangular in cross-section, whereby any rotation of a member disposed thereon about the flange will be restricted.

It will also be appreciated that connecting member 72 may include additional holes, sleeves, flanges, etc. for supporting other clamps, tools, etc. beyond its primary functions of securing extension 24 to power tool 10 and providing a support for clamping mechanism 50. For example, sleeve 77 is shown in FIG. 3 for securing clamp 37 (seen in FIG. 1) to the work table of power tool 10.

A slidable member 80 is also provided on clamp support 70 which is cooperatively configured to circumscribe flange 78 and to be secured at various positions thereon. Flange 80 is also rectangular in cross-section, which tends to maintain the clamp member 60 generally parallel to work surface 22. Slidable member 80 is also adjustable along the length of flange 78 to provide an adjustment in the direction of the longitudinal axis of flange 78. This adjustment allows clamping mechanism 50 to be used with workpieces of differing widths. A T-shaped bolt 81 is utilized to secure slidable member 80 at a variety of fixed positions along flange 78.

A number of components are mounted to slidable member 80, and are configured to extend generally orthogonal to work surface 22. First receiving sleeve 82 is a hollow cylindrical member configured to receive clamp member 60 in a pivotable relationship through first receiving aperture 82a. An adjustment 83 is provided at the opposite end to that which receives clamp member 60 for adjusting the height of clamp member 60. This adjustment allows clamping mechanism 50 to accommodate varying heights of workpieces. Preferably, adjustment 83 comprises a threaded aperture and a bolt threadably engaged with the aperture to provide a stop against which pin 65 on clamp member 60 rests. Adjustment 83 may also include a nut which is threadably engaged with the bolt to fix the bolt at a set position.

A second receiving sleeve 84 is also included on slidable member 80 on a side thereof opposing first receiving sleeve 82. Sleeve 84 extends generally parallel to first receiving sleeve 82. Sleeve 84 is also cylindrical in shape and includes a second receiving aperture 84a for receiving force applying member 90 in a pivotable relationship. The preferred second receiving sleeve 84 does not include any height adjustment, since clamp member 60 can bear at many points along cylinder 94 without requiring a corresponding height adjustment for force applying member 90. However, a height adjustment mechanism similar to adjustment 83 for first receiving sleeve 82 may also be used for second receiving sleeve 84.

Figure 5:
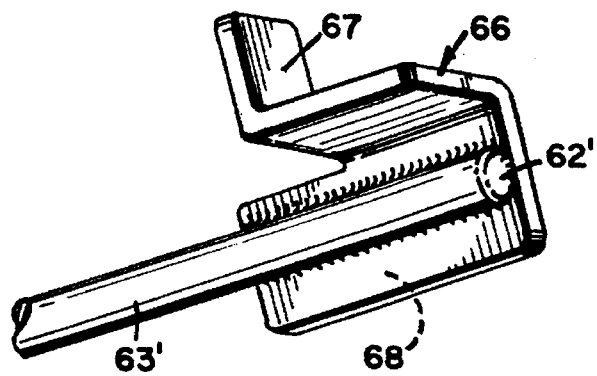
FIG. 5 is a partial fragmentary perspective view of an alternative clamping mechanism constructed consistent with the principles of the invention, showing stop and receiving flanges on a clamp member thereof.

Slidable member 80 also includes a stop member 85 which is preferably an elongated rod oriented parallel to the first and second receiving sleeves. The function of stop member 85 is to provide a stop for the handle of force applying member 90, preferably at the rotational position in which force applying member 90 supplies the greatest force to clamp member 60. Alternatively, a stop member 67 may be disposed on an elongated member 63' of a clamp member proximate a second end 62' thereof to perform a similar function, as shown in FIG. 5.

It will be appreciated that a number of modifications may be made to the general construction of clamp support 70. For instance, different adjustments for height, width and length may be provided other than those disclosed herein. For instance, slidable member 80 may be adjustable generally perpendicular to support surface 28a and 28b. However, it has been found that by providing an adjustment at a 45° angle along flange 78 keeps clamp member 60 out of the working area of power tool 10 regardless of the position of slidable member 80 along flange 78. Otherwise, it may be necessary to moving clamp support 70 away from power tool 10 along the longitudinal axis of support surface 28a and 28b in order to keep clamp member 60 a safe distance from the working area of power tool 10.

Returning to FIG. 3, clamp member 60 includes an elongated member 63 which is mounted transversely on a first pin 65. Clamp member 60 includes a first end 61 oriented proximate the work head of power tool 10 and a second end 62 oriented proximate force applying member 90.

Elongated member 63 is preferably 5/16 inch steel; however, various alternative materials, such as other metals, alloys or plastics may be used. It has been found that the preferred construction of elongated member 63 is somewhat deformable to prevent damage to a workpiece resulting from excessive force being applied by force applying member 90.

Elongated member 63 includes first and second straight portions 63a and 63b. First portion 63a is bent with respect to second portion 63b. This construction allows first portion 63a to be oriented generally parallel to support surface 28a and 28b when placed in an operating configuration. This allows a greater contact surface (designated a workpiece receiving surface) for contacting a workpiece. The larger contact surface evenly distributes the rotational force applied by force applying member 90 across a wider area, resulting in lesser damage to a workpiece, as well as a more secure grip. It is preferable to include a slip resistant member 64 circumscribing first portion 63a. Slip resistant member 64 is preferably constructed of rubber tubing or another suitable slip resistant member. It prevents slippage of the workpiece, and also reduces damage to workpieces from excessive force applied by force applying member 90. The second portion 63b of elongated member 63 is preferably of sufficient length to span work surface 22, which will vary depending on the particular configuration of power tool 10.

Elongated member 63 may alternatively include a specialized tip which is specifically configured for various types of workpieces. It will be appreciated that varying workpiece receiving surfaces may be provided, and that the particular configurations thereof would be dictated by the particular workpieces for which they are used.

A first pin 65 is transversely mounted proximate the second end 62 of elongated member 63. First pin 65 is sized and configured to be received in first aperture 82a of first receiving sleeve 82. Further, first pin 65 is of sufficient length to be supported by adjustment 83 of first receiving sleeve 82. Consequently, the height of clamp member 60 will be dictated by adjustment 83.

When placed in an operating configuration, elongated member 63 of clamp member 60 is oriented to pivot in a parallel plane to work surface 22. First pin 65 therefore provides a clamp axis by which the elongated member pivots. While in the preferred construction, first pin 65 is received within a similarly-sized sleeve, it will be appreciated that bearings or other friction-reducing members may be utilized to facilitate the rotation of clamp member 60 with respect to clamp support member 70.

As seen in FIG. 1, clamp member 60 is preferably configured to extend at an acute angle with respect to support surface 28a and 28b, and generally in the direction of work head 30 of power tool 10. By "acute", we mean an angle less than 90° (such as angle "A" seen in FIG. 2). In the preferred construction, this angle is about 45° or less since most power tools such as a miter saw are capable of rotating at most ±45° from a centered position. Also, some saws may rotate over 50° in either direction, in which case the angle formed by clamp member 60 and support surface 28a and 28b would preferably be less than 40°. In this configuration, clamp member 60 is able to orient the workpiece receiving surface on first portion 63a proximate work head 30 of power tool 10 without entering the effective work area thereof. It will be appreciated, therefore, that the particular angle in which clamp member 60 extends will vary depending upon safety concerns (how close it is desired to place clamp member 60 with respect to the working area of power tool 10), as well as the shape and size of the effective work area of power tool 10.

A number of alternative embodiments may also be provided for clamp member 60. For instance, as shown in FIG. 5, a receiving surface 68 may be provided proximate a second end 62' of an elongated member 63' of a clamp member for abutting force applying member 90. Also, as discussed above, a surface 67 may be provided proximate the second end 62' to act as a stop for the handle of force applying member 90. As shown in FIG. 5, surfaces 67 and 68 may be disposed on flanges located on a single member 66 welded to elongated member 63' proximate second end 62'.

In other embodiments, elongated member 63 may instead be slidably mounted to first pin 65, to provide an adjustment for differing widths of workpieces in addition to, or as an alternative to, the adjustment of slidable member 80 with respect to connecting member 72. It will be appreciated that a suitable securing means such as a T-shaped bolt may be used to secure the elongated member at a fixed position relative to first pin 65. Another alternative would be to include a toggle bolt to change the length of elongated member 63, also for adjusting for differing widths of workpieces. Further, rather than being rotatable, the clamp member may be displaceable in a linear direction perpendicular to its longitudinal axis (i.e., into the support surface and extending away from the power tool work head), whereby a toggle bolt or other mechanism could apply a force perpendicular to the clamp member to secure a workpiece against the support surface.

Returning to FIG. 3, force applying member 90 as shown herein operates as a cammed member for applying a force to second end 62 of clamp member 60. Force applying member 90 preferably includes a hollow cylindrical member 94 with a second pin 96 mounted to an inner wall thereof such that cylindrical member 94 is mounted eccentrically with respect to second pin 96. Second pin 96 is sized and configured to be received by second aperture 84a of second receiving sleeve 84 such that rotation about an axis thereof provides an eccentric rotation of cylindrical member 94. Consequently, a cammed surface 98 is provided on cylindrical member 94 which, through rotation of force applying member 90, provides varying displacements of the surface from the rotational axis provided through second pin 96. A handle 92 is also mounted to cylindrical member 94 generally opposing the connection to second pin 96. This enables handle 92 to abut stop 85 at the maximum displacement of clamp member 60.

It may be seen that cammed surface 98 of force applying member 90 is configured to abut elongated member 63 proximate the second end thereof. Consequently, a rotation of force applying member 90 increases the effective diameter of cammed surface 98 from second pin 96. The increased diameter displaces the second end 62 of clamp member 60 and induces a rotational force to clamp member 60. The rotational force provided by force applying member 90 is then applied laterally to a workpiece by the rotation of clamp member 60.

Force applying member 90 also acts as a stop for restricting the movement of clamp member 60 when in an unlocked configuration. For example, when unlocked, clamp member 60 of the left clamping mechanism 50 seen in FIG. 2 is prevented from rotating outward from support surface 28a and 28b and into the effective work area 35 of power tool 10. This is important for safety reasons since the free clamp member might otherwise rotate into the work area and possibly contact a moving component such as a saw blade on power tool 10. As seen in FIG. 1, it will also be appreciated that force applying member 90, and handle 92 are displaced outside of the effective work area of work head 30 of power tool 10. Consequently, clamping mechanism 50 may be unlocked or locked by an operator without the operator's hands entering into the effective work area of power tool 10. Again, this provides an important safety feature in protecting an operator from danger when using power tool 10.

It will be appreciated by one of skill in the art that various alternative constructions may be used to apply the rotational force to clamp member 60. For instance, a toggle bolt could be included proximate the second end of clamp member 60 to provide a linear force for rotating clamp member 60. Also, a linear or cammed member such as force applying member 90 may apply a force between first end 61 and first pin 65, rather than the configuration shown herein in which a force is applied between first pin 65 and second end 62. Other mechanisms for applying a force to displace a rotating member are known in the art.

Returning to FIG. 1, the operation of clamping mechanisms 50 is now discussed. It is preferable to include two clamping mechanisms to support a workpiece on either side of work head 30 of power tool 10. This enables workpiece 1 to be secured against support surface 28a and 28b even after workpiece 1 is cut by power tool 10. This provides an additional safety benefit over many prior clamping mechanisms, since the cut end of the workpiece is less likely to become forcefully expelled from power tool 10.

First, clamping mechanisms 50 must be adjusted for the particular workpiece 1 which is to be operated upon by power tool 10. As discussed above, a lateral adjustment may be provided in some embodiments by adjusting the position of connecting member 72 along rails 25 of extension 24. Also, the height of clamp members 60 with respect to work surface 22 may be varied with adjustments 83. Further, slidable members 80 may be adjusted relative to connecting members 72 to accommodate for varying widths of workpieces, or if used, a toggle mechanism or slidable connection between elongated member 63 and first pin 65 may be adjusted to vary the effective length of clamp member 60 to serve the same function. It will be appreciated by one of skill in the art, however, that for most workpieces, only the latter adjustment will be made with any frequency. In fact, it has been found that lateral adjustments along the length of support surface 28a and 28b are rarely required, and consequently, the configuration shown in FIG. 3 that does not have such an adjustment is still effective for clamping a variety of workpieces against support surface 28a and 28b.

A second step in the operation of the preferred mechanisms is to orient a workpiece in a desired cutting position for operation thereon by a power tool. Typically, this will be performed by orienting the workpiece on work surface 22 between support surface 28a and 28b and clamp members 60.

Third in the operation of the preferred device, handle 92 of force applying member 90 is rotated until a sufficient force is applied to clamp member 60 to secure workpiece 1 between clamp member 60 and support surface 28a and 28b. It will be appreciated that the amount of rotation of force applying member 90 will vary with the workpiece and the adjustment of clamping mechanism 50.

A number of advantages are provided by the preferred construction. First, the preferred clamping mechanism 50 applies a lateral force to a workpiece, rather than a linear force as is applied by many prior art devices. As shown in FIG. 2, clamp member 60 provides a force (shown by arrow 90) in a plane parallel to the work surface, with components configured to resist pulling by the power tool. The first component (shown by arrow 91) of the lateral force applied to the workpiece is generally perpendicular to support surface 28a and 28b to provide a clamping action between clamp member 60 and support surface 28a and 28b. The second component (shown by arrow 92) of the lateral force acts generally parallel to support surface 28a and 28b but away from work head 30 of power tool 10. This second component acts to resist the pulling forces applied by power tool 10, which are particularly prevalent when the work head of the power saw is oriented at a 45° angle (such as shown in FIG. 2 by saw blade 33' and handle 32'). In contrast, if a linear force was applied to clamp member 60 along its longitudinal axis, rather than the rotational force which is applied by force applying member 90, the components of the linear force would act in conjunction with the power tool to draw the workpiece through the tool. This may result in the workpiece becoming dislodged from the work surface, ultimately resulting in poor quality cuts, as well as a potential hazard to the operator.

An additional advantage of the preferred clamping mechanism is that it applies a force close to the effective work area (such as area 35 in FIG. 2) without actually entering the area or otherwise obstructing the work head of the power tool. First, this enables very small pieces to be securely clamped by clamping mechanism 50. Second, it enables such small pieces to be clamped without obstructing the operation of power tool 10. Even for larger workpieces, a more secure clamping action is provided since the workpieces are locked down closer to the area worked upon by power tool 10. As discussed above, many prior art clamps such as C-clamps apply only a force perpendicular to support surface 28a and 28b. When clamping relatively small workpieces, these clamps would most likely obstruct the rotation of work head 30 of power tool 10, or conversely, if placed outside of the effective work area would not be usable with small workpieces.

Another advantage of the preferred clamping mechanism 50 is the significant safety features which are inherently built into the mechanism. First, the clamping mechanism may be locked and unlocked by an operator without the operator's hands ever entering the effective work area of the tool. Also, the clamp member may clamp a workpiece to support surface 28a and 28b proximate the work head of power tool 10, but without ever entering the effective work area of the tool. Clamp member 60 is also prevented from entering the effective work area of power tool 10 even when unlocked through the limiting mechanism provided by force applying member 90. Consequently, the use of the preferred clamping mechanism is generally safer than many prior art clamps insofar as contact of a saw blade or other power tool component with an operator or with the clamping mechanism is less likely.

Therefore, it may be seen that the present invention provides clamping mechanisms which are safe, secure, and easily operatable. As one skilled in the art will appreciate that various modifications may be made to the preferred embodiments without departing from the spirit and scope of the invention, the invention thus resides in the claims hereafter appended.

I claim:

1. A clamping mechanism for securing a workpiece proximate a power tool on a work surface, wherein a support surface is defined on the work surface and extends generally orthogonal thereto, the clamping mechanism comprising:
   (a) a clamp member having first and second ends, wherein the first end of the clamp member is configured to operatively abut a workpiece in a working area defined for the power tool;
   (b) force applying means, moving between repeatable unlocked and locked positions, for applying a force to the clamp member in the locked position to secure the workpiece between the clamp member and the support surface, wherein the clamp member thereby applies a force to the workpiece, the force applied by the clamp member having first and second components directed in a plane generally parallel to the work surface, the first component being directed substantially perpendicular to the support surface, and the second component being directed substantially parallel to the support surface in a direction away from the working area; whereby the clamp member resists pulling forces applied by the power tool to the workpiece; and
   (c) stop means, abutting the force applying means in the locked position, for limiting movement of the force applying means beyond the locked position.

2. The clamping mechanism of claim 1, further comprising securing means, operatively disposed in a fixed location relative to the support surface and outside of the working area defined for the power tool, for securing the clamp member such that the clamp member extends in a direction generally towards the working area at an acute angle with respect to the support surface.

3. The clamping mechanism of claim 2, wherein the clamp member extends towards the working area at about a 45 degree or lesser angle with respect to the support surface.

4. The clamping mechanism of claim 2, wherein the clamp member is pivotally secured to the securing means between the first and second ends such that the clamp member is pivotable about a clamp axis in a plane generally parallel to the work surface, and wherein the force applying means is configured to apply a rotational force to the clamp member for securing the workpiece between the clamp member and the support surface.

5. The clamping mechanism of claim 4, wherein the force applying means comprises a cammed member eccentrically disposed, and rotatable about, an axis which is oriented parallel to the clamp axis, wherein the cammed member includes a camming surface configured to operatively abut the clamp member such that a rotation of the cammed member applies the rotational force to the clamp member.

6. The clamping mechanism of claim 5, wherein the cammed member operatively abuts the clamp member between the second end and the clamp axis, and wherein the cammed member is configured to impede rotation of the clamp member into the working area of the power tool.

7. The clamping mechanism of claim 2, wherein the clamp member comprises an elongated rod having a first and a second elongated portion defined thereon, wherein the first elongated portion is disposed at the first end of the clamp member and is oriented generally parallel to the support surface.

8. The clamping mechanism of claim 7, wherein the clamp member further comprises a slip resistant member disposed on the first elongated portion to inhibit slipping of the workpiece.

9. The clamping mechanism of claim 7, wherein the elongated rod is deformable to limit damage to the workpiece when excessive force is applied by the force applying means.

10. The clamping mechanism of claim 2, wherein the securing means includes first adjusting means for adjusting the position of the first end of the clamp member respective to the support surface along an axis generally parallel to a longitudinal axis of the clamp member; whereby the clamp member is adjustable for workpieces of varying widths.

11. The clamping mechanism of claim 10, wherein the securing means includes second adjusting means for adjusting the position of the first end of the clamp member respective to the support surface along an axis generally parallel to the support surface.

12. The clamping mechanism of claim 11, wherein the securing means includes third adjusting means for adjusting the position of the first end of the clamp member in a direction generally perpendicular to the work surface; whereby the clamp member is adjustable for workpieces of varying heights.

13. A clamping mechanism for securing an object against a support surface, comprising:
   (a) a clamp support member configured at a fixed position relative to the support surface;
   (b) a clamp member having first and second ends and pivotally mounted to the clamp support member to pivot about a clamp axis, wherein the clamp member is pivotable in a plane generally orthogonal to the support surface, and wherein in a locked configuration, the clamp member extends at an acute angle relative to the support surface;
   (c) a force applying member coupled to the clamp support member and abutting the clamp member, at least in the locked configuration, between the clamp axis and at least one of the first and second ends to apply a rotational force to the clamp member and thereby secure an object between the support surface and the clamp member proximate the first end thereof, the force applying member moving between repeatable unlocked and locked positions, wherein the locked position is set by a stop member abutting the force applying member in the locked position and thereby limiting movement of the force applying member beyond the locked position; whereby the clamp member applies a force laterally to the object.

14. The clamping mechanism of claim 13, wherein the support surface is disposed upon a working table of a power tool and is oriented generally orthogonal to a working surface thereon, wherein a working head of the power tool is movable between a plurality of positions within a defined working area, and wherein the clamp member is oriented such that an end portion of the clamp member distal from the clamp axis operatively abuts an object disposed within the working area of the power tool with a remaining portion of the clamp member disposed outside of the working area of the power tool.

15. The clamping mechanism of claim 14, wherein the force applying member is disposed on the clamp support member, and wherein the clamp support member is disposed outside of the working area of the power tool such that locking and unlocking of the clamp may be performed without a user reaching within the working area of the power tool.

16. The clamping mechanism of claim 13, wherein the clamp member extends at a 45 degree or lesser angle relative to the support surface.

17. The clamping mechanism of claim 13, wherein the force applying member comprises a cammed member rotatably coupled to the clamp support member and rotatable about an axis generally parallel to the clamp axis, the cammed member including a cammed surface operatively abutting the clamp member such that a rotation of the cammed member applies the rotational force to the clamp member.

18. The clamping mechanism of claim 17, wherein the cammed member operatively abuts the clamp member between the clamp axis and the second end.

19. The clamping mechanism of claim 13, wherein the clamp support member comprises a fixed connecting member having a flange oriented at an acute angle relative to the support surface and a slidable member being slidably mounted to the flange such that it is positionable at a plurality of positions along the flange, and wherein the clamp member is pivotally mounted to the slidable member; whereby the clamp member is adjustable for objects of varying widths.

20. A clamping mechanism for securing a workpiece to a work table of a power tool, the work table having a work surface and a support surface oriented generally orthogonal to the work surface, and the power tool having a work head movable between a plurality of positions within a work area, the clamping mechanism comprising:

(a) a clamp support member operatively connected to the work surface at a fixed distance from the support surface, the clamp support member including a work surface connecting member having a flange extending generally parallel to the work surface and at about a 45 degree or lesser angle to the support surface, and a slidable member slidable along the flange such that it is positionable at a plurality of positions thereon, wherein the work surface connecting member is a component of a connection mechanism for securing an extension to the power tool;

(b) a clamp member having first and second ends and pivotally mounted to the clamp support member, the clamp member including an elongated portion extending from the first to the second end and a first pin connected proximate the second end and oriented orthogonal to the elongated portion, the elongated portion having a workpiece receiving surface disposed at the first end thereof, the workpiece receiving surface being a slip resistant member for inhibiting slipping of the workpiece;

(c) a force-applying member having a cylindrical member mounted eccentrically on a second pin and a handle operatively connected to the cylindrical member and oriented orthogonal to the second pin;

(d) a first receiving aperture defined on the slidable member and receiving the first pin on the clamp member such that the elongated portion thereof is pivotable through a plane oriented generally parallel to the work surface, such that the elongated portion extends towards the power tool at about a 45 degree or lesser angle with respect to the support surface, and such that the workpiece receiving surface is oriented generally parallel to the supporting surface;

(e) a second receiving aperture defined on the slidable member and receiving the second pin on the force-applying member such that the handle is rotatable through a plane oriented generally parallel to the work surface, wherein the first and second receiving apertures are oriented with respect to one another such that the cylindrical member of the force applying member operatively abuts the elongated portion of the clamp member between the first pin and the second end of the clamp member, such that rotation of the force applying member applies a rotational force to the clamp member to secure a workpiece on the work surface between the support surface and the clamp member, and such that the force applying member inhibits rotation of the clamp member into the work area when the clamp member is in an unlocked configuration.

21. An apparatus, comprising:

(a) an extension member, coupled to a work table of a power tool, the extension member including a work surface for supporting an object, and a support surface extending generally orthogonal to the work surface;

(b) a clamp support member secured to the extension member at a fixed position relative to the support surface;

(c) a clamp member having first and second ends and pivotally mounted to the clamp support member to pivot about a clamp axis, wherein the clamp member is pivotable in a plane generally orthogonal to the support surface, and wherein in a locked configuration, the clamp member extends at an acute angle relative to the support surface; and (d) a force applying member coupled to the clamp support member and abutting the clamp member, at least in the locked configuration, between the clamp axis and at least one of the first and second ends to apply a rotational force to the clamp member and thereby secure the object between the support surface and the clamp member proximate the first end thereof, the force applying member moving between repeatable unlocked and locked positions, wherein the locked position is set by a stop member abutting the force applying member in the locked position and thereby limiting movement of the force applying member beyond the locked position; whereby the clamp member applies a force laterally to the object.

* * * * *